UNITED STATES PATENT OFFICE.

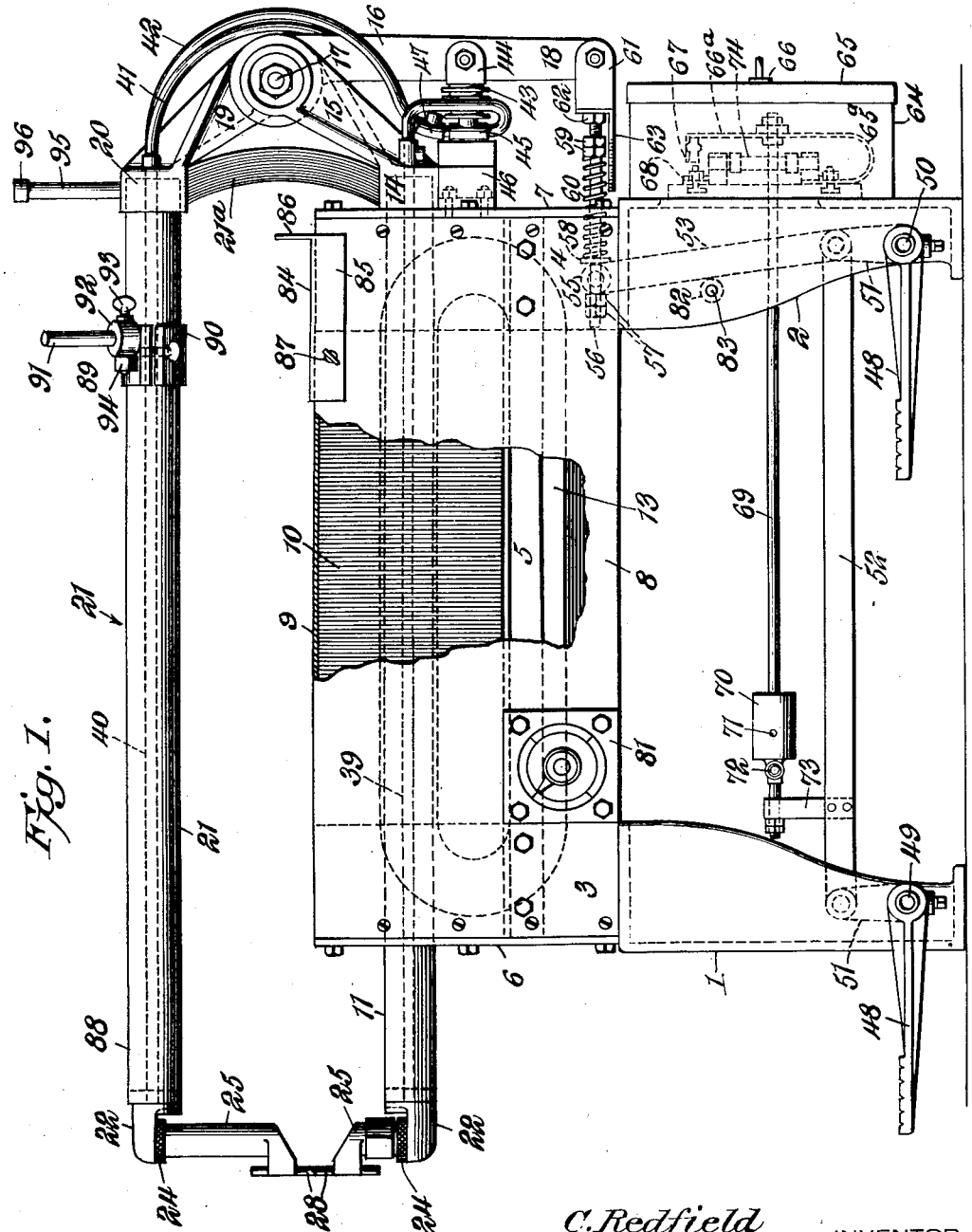

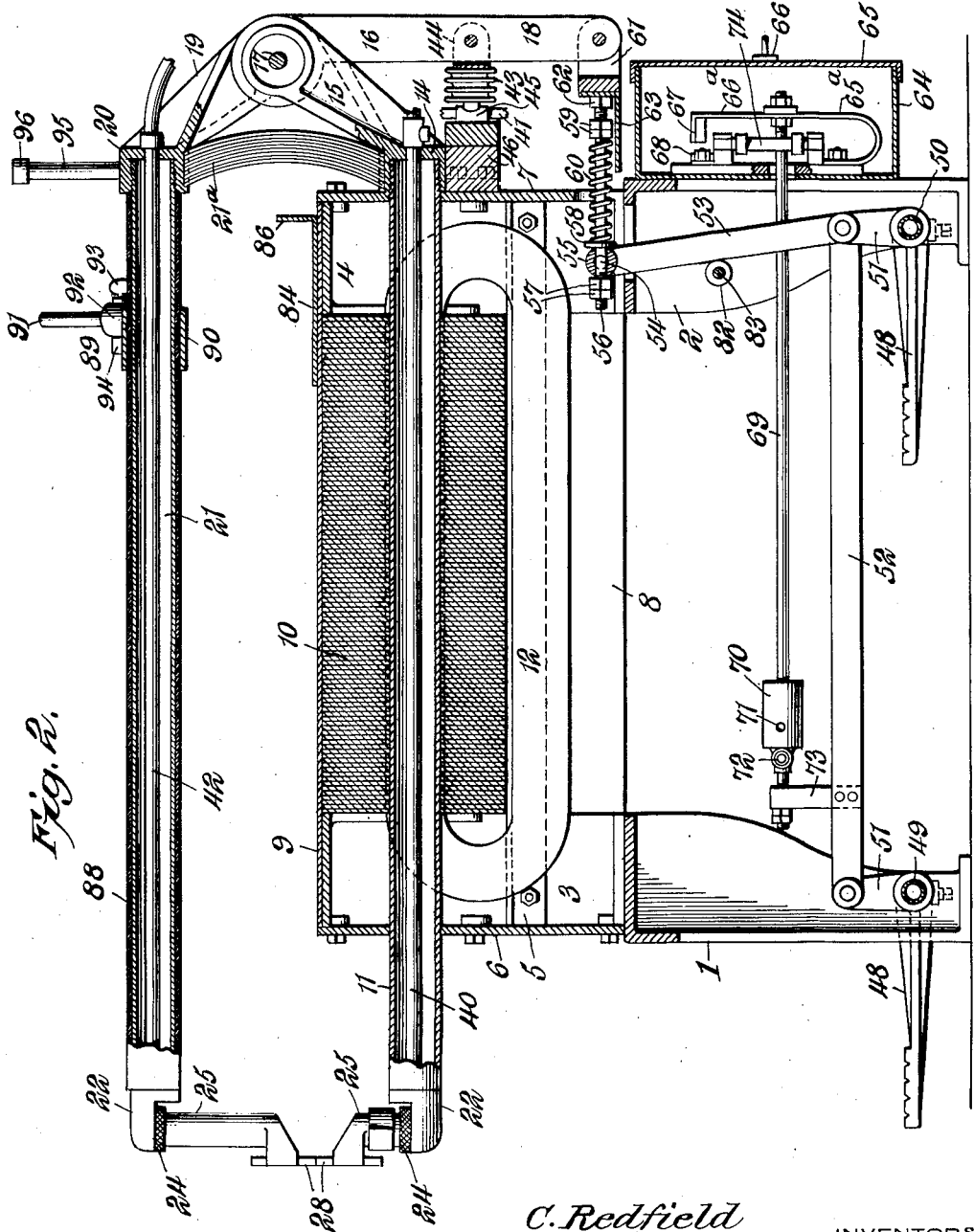

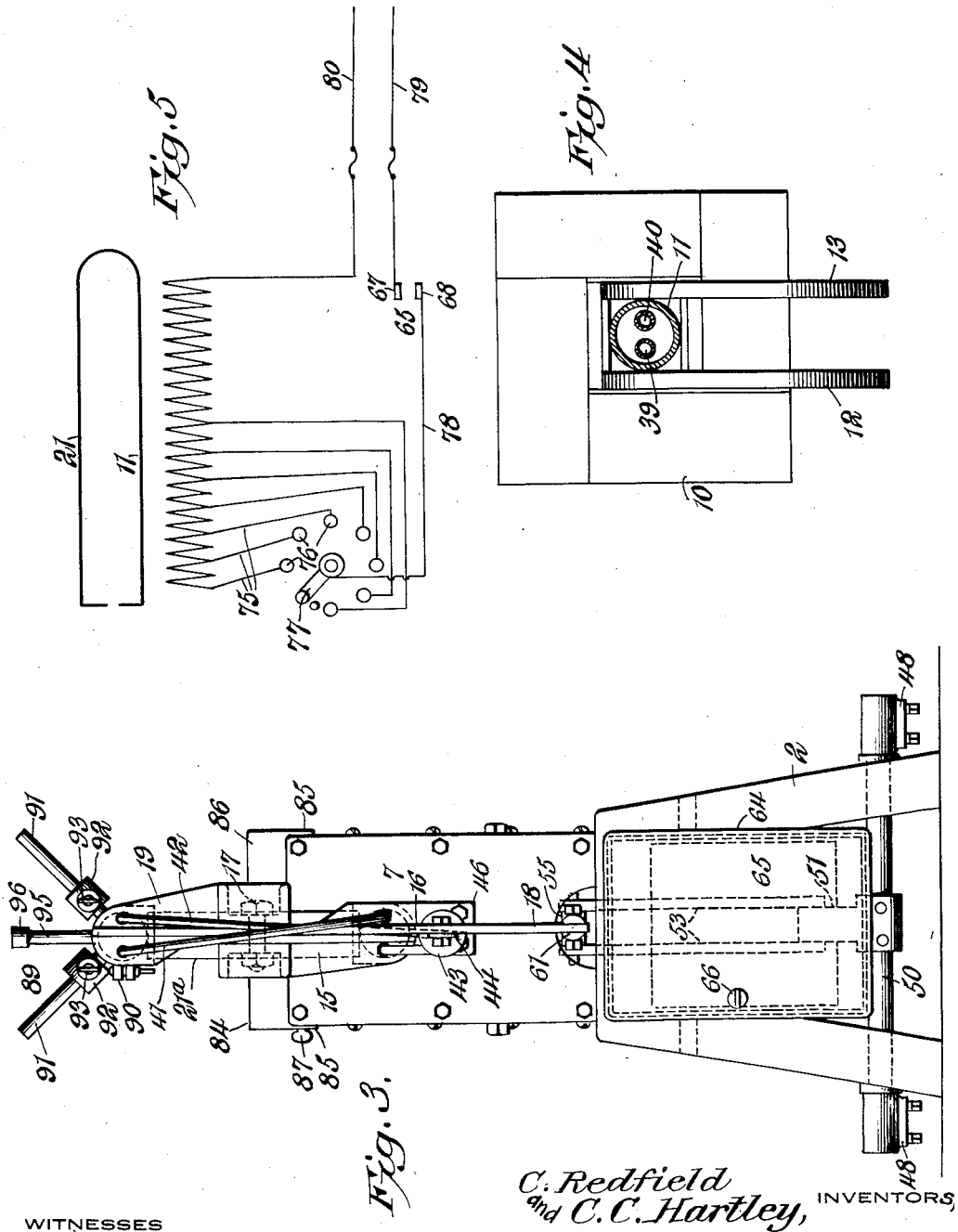

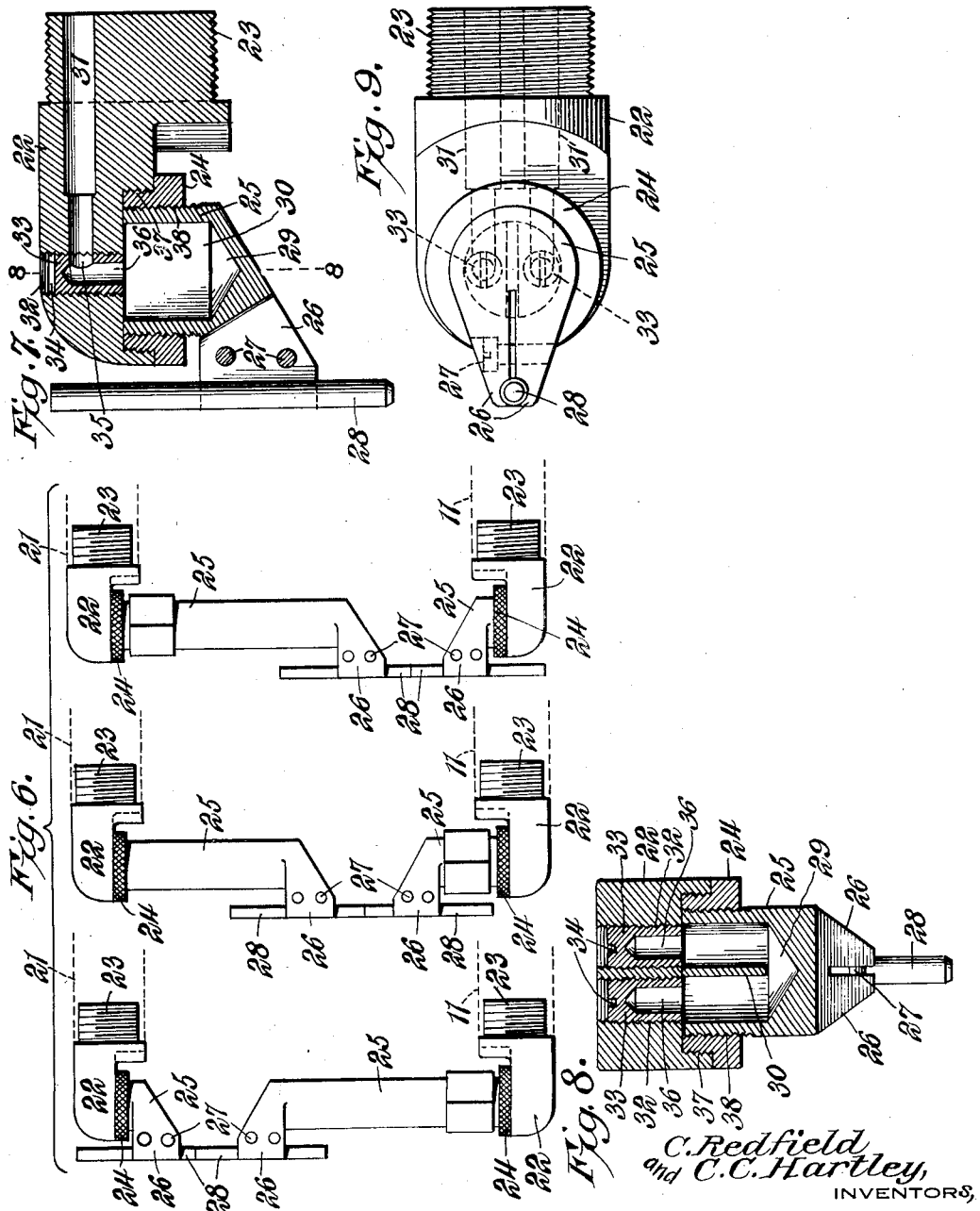

CLEVELAND REDFIELD AND CHARLES C. HARTLEY, OF OGDEN, UTAH, ASSIGNORS TO AUTOMATIC CONTROLLER AND MANUFACTURING CO., OF OGDEN, UTAH, A CORPORATION OF UTAH.

ELECTRIC WELDING-MACHINE.

1,362,962.  Specification of Letters Patent.  Patented Dec. 21, 1920.

Application filed April 15, 1919. Serial No. 290,247.

*To all whom it may concern:*

Be it known that we, CLEVELAND REDFIELD and CHARLES C. HARTLEY, citizens of the United States, residing at Ogden, in the county of Weber and State of Utah, have invented a new and useful Electric Welding-Machine, of which the following is a specification.

This invention has reference to electric welding machines, and its object is to provide a simple and particularly efficient machine for spot welding plates or sheets of metal whether in flat, curved or tubular form.

The invention comprises a welding machine with an elongated throat portion having arms carrying electrodes and between which arms the plates or sheets to be welded may be placed in such manner as to be engaged by the electrodes. The welding is performed by heavy electric currents generated in the throat portion of the machine, which is so constructed as to constitute the secondary of a transformer, and the primary winding and core of the transformer are associated with one arm of the throat constituting the secondary of the transformer so that throat induction is in great measure eliminated.

The invention contemplates adjustable mountings for the spot welding electrodes, and arrangements for cooling the electrodes, for adjusting the electrodes in different ways, and for the ready control, both mechanically and electrically, of the machine for the welding operation.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation, with some parts broken away to disclose deeper parts of the machine.

Fig. 2 is a longitudinal vertical section of the machine showing some parts in elevation.

Fig. 3 is a rear elevation of the machine.

Fig. 4 is an end view of the primary and core portions of the transformer and showing one arm of the throat in cross section.

Fig. 5 is a diagram illustrating the wiring of the transformer and control therefor.

Fig. 6 includes a series of views of the electrode holders showing different adjustments thereof.

Fig. 7 is a longitudinal section of one of the electrode holders.

Fig. 8 is a section on the line 8—8 of Fig. 7.

Fig. 9 is a bottom plan view of the structure shown in Figs. 7 and 8.

Referring to the drawings, there is shown a main frame composed of legs 1 and 2 which may be of customary web and flange construction. Mounted on the leg 1 is an upward continuation or head 3 and mounted on the leg 2 is a similar head 4. The heads 3 and 4 are joined by angle beams 5 and each head is closed by a wall 6, 7 respectively. Side walls 8 and a top 9 complete the body portion which, above the legs 1 and 2, constitutes a casing open at the bottom.

Supported by the angle beams 5 is a laminated core 10 limited in length by the distance between the heads 3 and 4, which, by abutting against the ends of the core, hold it in place. Furthermore, the core is traversed lengthwise by a tube 11 constituting a portion of the secondary coil of a transformer of which the core 10 forms a part. The core is also traversed by one branch of each of two coils 12 and 13 respectively, arranged on opposite sides of the tube 11 constituting one part of the secondary coil of the transformer, the coils 12 and 13 together constituting the primary of the transformer. The coils 12 and 13 are of elongated construction and the other branch of each coil is located below the core 10 within the casing in such position as to be exposed to the air.

One end of the tube 11 extends through the head 7 and is there threaded and enters a threaded socket 14 forming a part of a bracket 15 constituting a pivotal support for a lever 16 which is connected to the bracket by a pintle 17. The lever 16 is an angle lever having two arms 18 and 19 respectively, the arm 19 terminating in a threaded socket 20 into which is screwed one end of a tube 21 similar to and above the tube 11 as well as being above the core 10. The two tubes 11 and 21 are joined at the end adjacent to the lever 16 by a multiple leaf spring 21ª sufficiently massive to serve as a conductor for the heavy currents generated in the secondary of the welding transformer. The spring 21ª tends to move the other end of the pipe or arm 21 away from the corresponding end of the pipe or arm 11, which latter named arm is fixed. Each tube 11 and 21 has the end remote from the hinged end closed by a block 22 having a threaded nipple 23 entering and closing the outer end of the tube 11 or 21 as the case may be. Each block 22, best shown in Figs. 7, 8 and 9, has an overhang portion at the end remote from the nipple 23 and this overhang has threaded into it a bushing 24 entering the overhang at substantially right angles to the length of the block 22. Screwed into the bushing 24 is a hollow threaded shank 25, forming part of an electrode holder, and furnished with opposed jaws 26 traversed and joined by screws or bolts 27. These jaws may be integral parts of the electrode holder 25 and at their outer ends are grooved or otherwise shaped to receive and grip an electrode 28 usually in the shape of a rod.

The shank of the electrode holder 25 has a chamber 29 formed therein divided into two parts by a web 30. The head 22 and nipple 23 have passages or ducts 31 lengthwise thereof and each duct opens into a branch duct 32 into which there is introduced a screw plug 33. In order to turn the screw plug it is provided at the outer end with a slot 34 to receive a screw-driver, or the plug may be otherwise formed to permit the application of a turning tool. The duct 32 opens into the chamber 29 and is provided on one side with a port 35 for communication with the duct 31 and in turn opening into a longitudinal passage 36, in the plug, opening at one end into the chamber 29 and closed at the other end except for the port 35. By means of the plug 33 each duct 31 may be made to open or close communication between the duct 31 and the chamber 29.

The bushing 24 has exterior screw-threads 37 and interior screw-threads 38, and the parts engaged thereby are similarly threaded, but the screw-threads 37 and 38 are of different pitch, whereby the electrode holding head may be turned to different positions on an axis perpendicular to the longitudinal axis of the tubes 11 and 21 and there locked.

The electrode heads 25 are made of different lengths, there being provided, in an installation, short, long and intermediate heads so that the electrodes may have their adjacent ends near the tube 11 or near the tube 21, or at some intermediate point.

The tubes 11 and 21, the connecting conductor or yoke 21ª and the electrode holders, form the secondary of the transformer, and the structure is such that this secondary is capable of transmitting extremely heavy currents induced therein by the primary coils after the manner of ordinary electric welding transformers. The primary 12 of the transformer may be so built as to utilize ordinary street current of alternating character and the secondary is, in effect, a coil of a single turn producing heavy current of very low voltage.

The welding current causes a large quantity of heat in the welding operation and therefore it is desirable that the electrode holders be cooled. It is for this reason that the ducts 31, ports 35, passages 36 and divided chambers 29 are provided. Extending through the tube or arm 11 are pipes 39 and 40 respectively, each entering a respective one of the passages 31. Extending through the pipe or arm 21 are similar pipes 41 and 42 respectively, similarly connected to the electrode holder head or block 22 at the corresponding end of the pipe or arm 11. The pipes 39 to 42 connect with a pump 43, in turn connected by a link 44 to the lever 18 for operation. The pump 43 is provided with a suitable valve structure 45 carrying the pump and in turn carried by a block 46 fast to the wall 7. Whenever the lever 18 is moved by causing the approach or separation of the electrodes the pump is actuated, thus forcing water through the pipes in sufficient quantities to cool the electrode carrying ends of the arms 11 and 21. The valve structure of the pump is provided with a T-coupling 47 whereby a supply of water under pressure may be connected thereto and a continual circulation of water provided instead of the intermittent flow of water caused by the pump. No description is given of the internal structure of the pump, for pumps suitable for the purpose are obtainable upon the market.

In order to close the throat formed by the pipes or arms 11 and 21 of the secondary of the transformer, treadle structures are provided. But one treadle is needed for the manipulation of the welding throat composed of the arms or tubes 11 and 12. However, four treadles or foot treads 48 are located at the front and rear portions of the machine, two being at the front and two at the rear on opposite sides of the machine so that an operator or more than one operator has considerable latitude in the control of the throat in order to be able to operate upon various structures.

Journaled in opposite sides of the leg 1 is a rock shaft 49 to the opposite ends of which a pair of foot treads 48 is secured, and journaled in opposite sides of the leg 2 is another rock shaft 50 carrying the other pair of foot treads 48. The two shafts 49 and 50 have short upstanding rock arms 51 secured thereto and these rock arms are connected by a link 52, the arrangement being such that whenever one of the foot treads 48 is actuated the link 52 is moved. Connected to the rock arm or arms 51 of the rock shaft 50 is one end of another link 53, in turn connected at the end remote from the rock arm 51 to a rod 54 by means of a swivel joint 55. The rod 54 has a threaded end 56 carrying lock nuts 57 and a washer 58 on opposite sides of the swivel joint 55. The other end of the rod 54 is threaded and carries lock nuts 59 between which and the washer 58 the rod carries a spring 60. The rod 54 is coupled by a yoke connection 61 with the lower end of the lever arm 18, and held to the connection 61 by a nut 62 on the rod 54 is a gage plate 63 for setting the adjustment of the mechanical pressure that will be applied to the electrodes for different weights of metal to be spot welded.

A suitable box or casing 64 is located at a convenient point at the rear of the machine, for protection purposes, and is provided with a door 65 and lock 66 to prevent any but authorized access. Within the box 64 is a main switch 65ª which may comprise an elastic arm 66ª ending in a contact terminal 67 associated with a fixed contact terminal 68. The switch is under the control of a rod 69 connected to a dash-pot 70, which latter may be of the familiar piston and cylinder type with a vent 71 in a chosen position. The dash-pot is timed by an air valve 72 and one member of the dash-pot is carried by a bracket 73 fast to the link 52. The time limit is set by adjusting the valve 72. The box or casing 64 may also contain fuses 74 for the protection of the electrical side of the structure.

The primary coil 12 is provided with a suitable number of taps 75 each leading to a contact 76 and these contacts are arranged in the path of a switch arm 77 connected by a conducter 78 to the terminal 68 of the main switch. The other terminal 67 of the main switch is connected to a main conductor 79 through one of the fuses 74. The end of the primary coil 12 remote from the taps 75 is connected to another main conductor 80 through the other one of the fuses 74. The electrical arrangement just described is shown in Fig. 5 and the switch 77 and contacts 76 are carried by a box 81 which may be conveniently located close to the forward end of the machine so that an operator can control the welding current in accordance with circumstances.

Ordinarily the weding points or electrodes 28 are separated because of the action of the spring 21ª, wherefore, the work to be joined by spot welding can be readily introduced into the throat of the machine between the electrodes.

Having properly positioned the work the operator has but to press upon one of the foot treadles 48, thereby moving the link 52 in a direction to actuate the link 53, which fulcrums against a roller 82 carried by a rod 83 mounted in the leg 2. The movement of the link 53 acts elastically through the spring 60 on the rod 54 to rock the lever 16 on its pivot 17 in a direction to overcome the normal action of the spring 60 and cause the welding points or electrodes to approach and engage the work between them. The spring 60 permits a greater movement of the foot treadle than is necessary to bring the electrodes in contact with the work so that when desired pressure may be caused where the work is engaged by the electrodes. By a proper adjustment of the parts the electrodes are brought into contact with the work and a suitable pressure is applied at such point, whereupon, the main switch 65 becomes closed and the primary coil 12 is energized, thereby generating a heavy welding current in the secondary coil. The welding current passes through the work where engaged by the electrodes and the work is locally heated to a welding temperature and the metal is not only softened but at the same time is pressed together locally, thus causing the contacting surfaces where heated to melt and coalesce to produce a local or spot weld. The uniting of the two metal members, which are to be understood as plates or sheets, is similar to riveting the metal sheets together, but with the advantage that the union is homogeneous and in no wise weakened as is the case with riveting where holes must be punched through the sheets to accommodate the rivets.

When pressure is relieved from the treadle the dash pot will, when the plunger of the dash pot reaches the vent 71, act quickly, thus causing the opening of the main switch rapidly and the dash pot will return to its first position ready to act as a retarding means for the next welding operation. Since commercial types of the dash pot are available for the purpose, no showing of the construction of the dash pot has been made.

Each time the treadles are operated the pump 43 is actuated, thus establishing a forward movement of the cooling fluid in the circulating system of the structure and excessive heating of the electrode heads is prevented.

Mounted on the casing inclosing the primary and core of the transformer is a gage 84, in the form of a slide, with side wings 85 for embracing the casing and an upstanding flange or abutment 86 against which work introduced into the throat of the secondary of the transformer may engage. A thumb screw 87 or any other suitable fastening means may be employed to hold the gage 84 in adjusted position.

The arm or bar 21 may be utilized for supporting pipe while being welded and for this reason the arm 21 is provided with an insulating sleeve 88 holding a pipe moved onto the arm against electrical contact therewith. In order to determine the extent of movement of the pipe onto the arm 21 there is provided a gage 89 comprising a split or sectional clamping body portion 90 carrying radially outstanding posts 91 in suitable angular relation and each post has a block 92 slidable thereon and provided with a thumb screw 93 for adjusting and fastening it. Each block 92 is provided with a roller 94 on which the pipe may be supported in such manner that the pipe may be readily turned about the longitudinal axis of the arm 21. By arranging the posts 91 in about 120° angular relation and equally spaced on opposite sides of the upright plane of such axis the pipe is sustained in proper pendent position.

When pipe is being spot welded suitable electrode holders are provided so that the upper electrode is located within the pipe and the lower electrode is outside of and underneath the pipe. The particular electrode holders chosen will of course depend upon the diameter of the pipe being welded.

For filling the system with cooling liquid a stand-pipe 95 is carried by the arm 21 near the rear end thereof and is provided with a cap 96.

What is claimed is:—

1. An electric welding machine having a welding transformer located intermediately of the length of and in part constituting the throat of the machine, to minimize throat induction.

2. An electric welding machine having a primary coil, a magnetic core and a secondary coil, with the latter constituting the throat of the machine and the primary coil and the magnetic core being located intermediate of the length of the throat to minimize throat induction.

3. An electric welding machine having a welding throat extending substantially the full length of the machine and constituting the secondary of a welding transformer, the primary and the magnetic core of the transformer being built into the throat to eliminate the greater portion of throat induction.

4. An electric welding machine comprising a welding throat including two arms each provided at one end with a carrier for a welding electrode, a primary winding with one side adjacent to one arm of the throat, and a core encircling the adjacent parts of the throat and primary winding, with the other side of the primary winding and the other arm of the throat on respectively opposite sides of the core and spaced therefrom.

5. An electric welding machine comprising an elongated welding throat including two arms connected together at one end and provided at the other end with carriers for welding electrodes, a magnetic core encircling one arm of the throat and extending lengthwise thereof, and a primary winding having one side extending through the core adjacent to the arm of the throat also extending through the core.

6. An electric welding machine comprising a welding transformer with a secondary winding including a single turn and consisting of a welding throat formed of two opposed arms with carriers at adjacent ends for welding electrodes and the other ends being hinged together, a primary winding with one side adjacent and in inductive relation to one arm of the throat, and a core inclosing said side of the primary winding and the arm of the throat adjacent thereto.

7. An electric welding machine comprising a welding transformer with an elongated secondary winding made up of a single turn and constituting a welding throat formed of two opposed elongated arms with electrode holders at adjacent ends and hinged together at the opposite ends, a primary winding with one side extending along and in inductive relation to one arm of the throat, and a magnetic core inclosing those parts of the primary winding and throat in inductive relation to each other.

8. An electric welding machine having a welding transformer built therein with the secondary coil of the transformer constituting the welding throat of the machine, one side of the primary coil and one side of the secondary coil being in inductive relation to each other, and the magnetic circuit of the transformer inclosing said associated sides of the coils, with the other sides of the primary and secondary coils disposed on respectively opposite sides of the magnetic circuit of the transformer.

9. An electric welding machine having a welding transformer built into the throat of the machine and said throat constituting the secondary coil of the transformer, one side of the primary coil and one side of the secondary coil being associated and the core of the transformer inclosing the associated sides of the coils, the secondary coil of the transformer constituting a welding throat and the magnetic circuit of the transformer having the side thereof within the welding throat constituting a table upon which the metal to be welded may rest.

10. An electric welding machine having a transformer for producing a welding current, said transformer comprising a primary coil, a secondary coil constituting the welding throat of the machine, and a magnetic core inclosing one side of the primary coil and one side of the secondary coil and entering the welding throat in spaced relation to the other side of said secondary coil to constitute a table for supporting work to be welded, thereby causing such work to form a part of the magnetic circuit to eliminate magnetic induction in the work from the current carrying members of the throat.

11. An electric welding machine comprising a transformer for producing welding current, with the secondary coil of the transformer constituting a welding throat, and the primary and secondary coils of the transformer each having one side thereof associated with one side of the other, and a magnetic core inclosing the associated sides of the coils, the other sides of the primary and secondary coils completing their respective loops in open air space on opposite sides of the core.

12. An electric welding machine having a secondary or welding coil constituting the welding throat of the machine, said throat comprising two arms with carrying means at one end for welding electrodes and hinged together at the other end to permit opening and closing, and a magnetic core, one side or arm of the throat being inclosed by the magnetic core to eliminate magnetic throat induction.

13. An electric welding machine comprising a closed magnetic core, a primary winding having one side extending through the core and the other outside of the core, and a welding throat constituting a secondary coil of one turn having one side extending through the core in inductive relation to the corresponding side of the primary winding, and with the other side in spaced relation to the core.

14. An electric welding machine comprising an elongated welding throat and a transformer of which the throat constitutes the secondary, with the primary and core of the transformer located intermediate of the throat, said throat comprising two arms or bars hinged together at one end and at the other end provided with carrying means for welding points or electrodes, a lever connected to one of the arms of the throat and constituting a part of the hinge, and manipulating means for the lever whereby the throat may be opened or closed.

15. An electric welding machine comprising an elongated welding throat and a transformer of which the throat constitutes the secondary, with the primary and core of the transformer located intermediate of the throat, said throat comprising two arms or bars hinged together at one end and at the other end provided with carrying means for welding points or electrodes, a lever connected to one of the arms of the throat and constituting a part of the hinge, and manipulating means for the lever whereby the throat may be opened or closed, said throat also including spring means normally tending to open the throat and constituting conducting means for that end of the throat remote from the welding end whereby to complete the secondary circuit of the transformer at the hinged end thereof.

16. An electric welding machine comprising an elongated welding throat formed of two arms hinged together at one end and provided with electrode holders at the other end, spring means located at the end of the throat remote from the electrode holders and tending to open the throat, a lever connected to one arm of the throat, and manipulating means connected to the lever, said manipulating means including yieldable spring means for permitting movement of the manipulating means after the throat is closed.

17. An electric welding machine comprising an elongated welding throat formed of two arms hinged together at one end and provided with electrode holders at the other end, spring means located at the end of the throat remote from the electrode holders and tending to open the throat, a lever connected to one arm of the throat, and manipulating means connected to the lever, said manipulating means including yieldable spring means for permitting movement of the manipulating means after the throat is closed, and also including adjusting means for the spring means and a gage for indicating the degree of adjustment.

18. An electric welding machine provided with a welding throat having opening and closing movements, manipulating means for causing the opening and closing movements, and an electric switch for controlling the flow of electric current to the machine, said switch being connected to the manipulating means for actuation thereby in timed relation to the opening and closing of the throat, the connections of the switch to the manipulating means including a dash-pot structure for determining the relation of the closure of the switch to the closure of the throat and for causing the quick opening of the switch.

19. An electric welding machine provided with a welding throat constructed to open and close, and manipulating means for closing the throat, said manipulating means including a plurality of foot pedals situated at different parts of the machine and having common connection to the throat to permit operation from different localities about the machine.

20. An electric welding machine comprising a throat having hollow arms movable to open and close the throat, said arms having electrode holders at the welding end of the throat, means for opening and closing the throat, and a circulating system for the throat having ducts extending through both hollow arms to the electrode holders and including means for supplying a cooling medium through the arms to the electrode holders.

21. An electric welding machine comprising a throat movable to open and closed positions, said throat having electrode holders at the welding end, ducts extending through the arms and leading to the electrode holders, a pump for causing the circulation of cooling medium through the ducts and holders, and manipulating means for opening and closing the throat and having connections with the pump, whereby the pump is operated each time the manipulating means are actuated.

22. An electric welding machine provided with a welding throat having arms with heads at the ends thereof, and electrode holders carried by the heads and separable therefrom, said arms having ducts therethrough for a cooling medium and the holders having ducts for directing the cooling medium thereinto from the arms, and cutoffs in the path of cooling medium from the arms to the holders whereby communication for cooling medium between the arms and the holders may be stopped to permit change of holders.

23. An electric welding machine provided with a welding throat having arms with heads at the ends thereof, and electrode holders carried by the heads and separable therefrom, said arms having ducts therethrough for a cooling medium and the holders having ducts for directing the cooling medium thereinto from the arms, and cutoffs in the path of cooling medium from the arms to the holders whereby communication for cooling medium between the arms and the holders may be stopped to permit change of holders, said cutoffs comprising plugs with passages therethrough movable to stop the flow of cooling medium from the ducts in the arms without removing said plugs.

24. An electric welding machine provided with rotatable electrode carriers, each comprising a head or block with a threaded socket therein, a bushing having external screw-threads matching those of the socket and also provided with internal screw-threads of different pitch from the external screw-threads, and an electrode carrying member having external screw-threads matching the internal screw-threads of the bushing, said electrode located eccentrically with relation to the axis of rotation of the holder with respect to the bushing.

25. An electric welding machine provided with a welding throat having long and short electrode holders, and an interchangeable extension adapted to either electrode holder, the holders and extension being all usable at the same time to allow a greater number of combinations of make-up than there are electrode holders, whereby to produce various degrees of extension of the electrodes.

In testimony that we claim the foregoing as our own, we have hereto affixed our signatures.

CLEVELAND REDFIELD.
CHARLES C. HARTLEY.

Witnesses:
DAVID JENSON,
BLENDA BROSTROM.